(12) United States Patent
Custers et al.

(10) Patent No.: US 8,382,989 B2
(45) Date of Patent: Feb. 26, 2013

(54) PROCESS FOR SEPARATING A CHARGED SPECIES FROM AN AQUEOUS SYSTEM

(75) Inventors: Johannes Petrus Aldegonda Custers, Baexem (NL); Rafaël Jean Sablong, Eindhoven (NL); Franciscus Adrianus Maria Leermakers, Wageningen (NL); Johannes Theodorus Faustinus Keurentjes, Helmond (NL); Dirk Theodorus Andreas Van Asseldonk, Eindhoven (NL)

(73) Assignee: Afira IPR B.V., Eindhoven (NL)

( * ) Notice: Subject to any disclaimer, the term of this patent is extended or adjusted under 35 U.S.C. 154(b) by 211 days.

(21) Appl. No.: 12/675,519

(22) PCT Filed: Aug. 29, 2008

(86) PCT No.: PCT/NL2008/050574
§ 371 (c)(1),
(2), (4) Date: Apr. 30, 2010

(87) PCT Pub. No.: WO2009/028944
PCT Pub. Date: Mar. 5, 2009

(65) Prior Publication Data
US 2010/0237019 A1 Sep. 23, 2010

(30) Foreign Application Priority Data
Aug. 29, 2007 (EP) .................................... 07115229

(51) Int. Cl.
*B01J 43/00* (2006.01)
*B01J 49/00* (2006.01)
*C02F 1/42* (2006.01)

(52) U.S. Cl. ........................... 210/670; 210/686; 521/26

(58) Field of Classification Search .................. 210/670, 210/686; 521/26, 28, 38
See application file for complete search history.

(56) References Cited

U.S. PATENT DOCUMENTS
3,957,698 A  5/1976  Hatch
(Continued)

FOREIGN PATENT DOCUMENTS
EP  1081492 A1  3/2001
WO  WO 2005/103124 A1  11/2005
WO  WO 2007/081803 A2  7/2007

OTHER PUBLICATIONS

Y. Murali Mohan: "Polyampholytic hydrogels: Poly(N-isopropylacrylamide)-based stimuli-responsive networks with poly(ethyleneimine)" Reactive & Functional Polymers, vol. 61, No. 2, Feb. 2007, pp. 144-155.

(Continued)

*Primary Examiner* — Matthew Savage
(74) *Attorney, Agent, or Firm* — Gilberto M. Villacorta; Sunit Talapatra; Foley & Lardner LLP

(57) ABSTRACT

The present invention relates to a process for separating a charged species from an aqueous system, wherein the process comprises the following steps: (a) a first aqueous system comprising the charged species is contacted at a first temperature with an ampholytic polymeric 5 system comprising cationic and anionic domains, wherein the charged species is bonded to the ampholytic polymeric system; and (b) the ampholytic polymeric system is contacted with a second aqueous system at a second temperature, wherein the charged species is released to the second aqueous system, wherein the second temperature is higher than the first temperature and wherein the second temperature is higher than the first temperature and wherein the second 10 temperature is less than 60° C.

24 Claims, 1 Drawing Sheet

U.S. PATENT DOCUMENTS

| | | | |
|---|---|---|---|
| 4,202,737 | A | 5/1980 | Shimizu |
| 4,378,439 | A | 3/1983 | Pilkington |
| 6,641,735 | B1 | 11/2003 | Yoshizako et al. |
| 2005/0234141 | A1 | 10/2005 | Johnson et al. |

OTHER PUBLICATIONS

Sinn Cornelia G et al: "Binding of ion pairs onto polymer gels via dehydration entropy: A new mechanism for ion exchange" Macromolecules; Macromolecules Sep. 5, 2006, vol. 39, No. 18, Sep. 5, 2006, pp. 6310-6312.

Hua Yu: "Thermo-Sensitive Swelling Behavior in Crosslinked N-Isopropylacrylamide Networks: Cationic, Anionic and Ampholytic Hydrogels" Journal of Applied Polymer Science, vol. 49, 1993, pp. 1553-1563.

International Search Report corresponding to PCT/NL2008/050574, dated Jan. 13, 2009, 4 pages.

PROCESS FOR SEPARATING A CHARGED SPECIES FROM AN AQUEOUS SYSTEM

CROSS-REFERENCE TO RELATED APPLICATIONS

This is a National Stage application of PCT/NL2008/050574, filed Aug. 29, 2008, which claims the benefit and priority of European Patent Application No. 07115229.2, filed Aug. 29, 2007. The foregoing applications are incorporated by reference herein in their entirety.

FIELD OF THE INVENTION

The present invention relates to ampholytic polymeric systems and a process for separating a charged species from an aqueous system by using an ampholytic polymeric system. More in particular, the present invention relates to a process for the demineralization or softening of water streams by using particular ampholytic polymeric systems.

BACKGROUND OF THE INVENTION

Current demineralization or softening systems often make use of ion exchange resins, e.g. in water purification plants, or softening chemicals, e.g. in laundry washing-machines and dishwashing-machines. The main disadvantage of the resins is that they loose their ion exchange capacity after a period of time and need to be regenerated. This regeneration step involves the use of additional chemicals like acids, bases or salts. These chemicals are harmful for the environment because they can cause salinization. The same holds for softening chemicals used in washing formulations used in laundry washing-machines and dish washing-machines. Salinization is known as the accumulation of soluble mineral salts near the surface of soil, usually caused by the capillary flow of water from saline ground water. Where the rate of surface evaporation is high, irrigation can exacerbate the problem by moistening the soil and causing water to be drawn from deeper levels as water evaporates from the surface. The evaporation of pure water leaves the salts behind, allowing them to accumulate, and they can reach concentrations that are toxic to plants, thus sterilising the land.

Alternative demineralisation or softening systems can be based on thermo-regenerable ion exchange resins. These resins can be regenerated at lower or higher temperatures than the temperature at which they are used without the addition of chemicals.

U.S. Pat. No. 4,152,496, WO 2005/103124 and US 2005/0234141, incorporated by reference herein, disclose a polyampholyte resin (hybrid copolymers) that can be thermally regenerated and which is capable of removing ions from a water stream. In particular, WO 2005/103124 and US 2005/0234141, both incorporated by reference, disclose a polyampholyte resin comprising a macroporous "host" copolymer and a second "guest" polymer which is contained in the pores of the macroporous "host" copolymer. The polyampholyte resin can be prepared in a non-aqueous solvent by crosslinking a polyacrylate with vinyl benzyl chloride in the presence of divinyl benzene as crosslinker followed by conversion of the chloride groups into amino groups. When the polyampholyte resin is contacted with water, the carboxylic and amino groups will ionize and form zwitterions consisting of carboxylate and ammonium groups. Upon contacting the resin in a subsequent step with a salt solution, preferably at a temperature of about 5° to 25° C., the salt cations and salt anion will bind to the ammonium and carboxylate groups, respectively. The salt may be removed at a later stage at higher temperatures, preferably at about 60° to 100° C., to regenerate the original resin. A disadvantage of such thermo-regenerable resins is that temperatures that are necessary for regeneration and that the temperature differences between binding the salt ions and regenerating the thermo-reversible resin are rather high (at least 35° C.) and that therefore these systems are energetically ineffective.

The regeneration of this resin is believed to be based on the principle that at high temperature, salts are more easily washed out of the resin when the positive and negative charged functional groups of the resin are placed close together and therefore lack the need of counter ions.

Another thermo-regenerable polymer system known in the art is disclosed in WO 2005/049679, incorporated by reference. This polymer system comprises a non-ionic polymer comprising anionic terminal end groups and can be used to remove multivalent metal cations from an aqueous system. WO 2006/078163, incorporated by reference, discloses a similar polymer system having cationic groups. These polymeric systems bind ions at temperatures higher than the critical micellization temperature (CMT) and can be regenerated at temperatures lower than the CMT. See also Custers et al., J. Am. Chem. Soc. 127, 1594-1595, 2005 and Lauw et al., Langmuir 22, 10932-10941, 2006, both incorporated by reference. The disadvantage of these systems is that binding occurs at elevated temperatures whereas regeneration occurs at lower temperatures. A reversed system, i.e. regeneration at a temperature higher than the CMT, would, however, be more preferable in certain applications such as laundry washing-machines and dish washing-machines.

Another disadvantage of the polymer systems according to WO 2005/049679 and WO 2006/078163 is that in thermo-reversible binding processes, wherein the polymer systems and a metal cation extracting aqueous phase are separated by a semi-permeable membrane, the Donnan-effect (also known as the Gibbs-Donnan effect) results in an uneven distribution of ions on either side of the membrane, which prevents the extraction from metal ions out of the polymer system to the extracting aqueous phase if the latter has a low ionic strength. As a consequence, when using such polymer systems, extracting aqueous phases which have a high ionic strength must be used in order to 'pull out' the cations bound to the polymer systems.

WO 96/06134, incorporated by reference, discloses responsive gels based on N-isopropylacryl amide, acrylic acid and acrylamide.

Alvarez-Lorenzo et al., Langmuir 17, 3616-3622, 2001, incorporated by reference herein, discloses a polyampholyte thermo-sensitive gel comprising carboxylate and ammonium groups.

Balamurugan et al., Langmuir 19, 2545-2549, 2003, incorporated by reference, discloses poly(N-isopropylacrylamide) brushes grafted on mixed self-assembled monolayers of gold by atom transfer radical polymerization.

Zhang et al., Polymer 46, 7695-7700, 2005, incorporated by reference, discloses a semi-interpenetrating network (semi-IPN) composed of a crosslinked copolymer of acrylamide/acrylic acid and linear polyallylammonium chloride.

U.S. Pat. No. 4,202,737, incorporated by reference, discloses a desalination process wherein a thermally regenerable ion exchange resin having weakly acidic free acid groups and weakly basic free base groups is contacted with an aqueous feed solution containing a salt of a strong acid. Hence, thermally regenerable ion exchange resin has only neutral free acid groups and neutral free basic groups. The thermally regenerable ion exchange resin may be a hybrid resin as is for example disclosed in U.S. Pat. No. 3,991,017, incorporated by reference, i.e. that it contains two crosslinked copolymer phases (IPN's). The thermally regenerable ion exchange resin may also be a composite ion-exchange resin as is for example disclosed in U.S. Pat. No. 3,645,922, incorporated by reference, i.e. that it contains composite particles of non-crosslinked ion exchange resins (cationic and anionic) which are dispersed in a homogeneous matrix of a crosslinked, water-insoluble polymer material.

Prior to or during the contacting step with the aqueous feed solution, the weakly basic free base groups are converted into the carbonate form of these weakly basic free base groups, e.g. ammonium hydrogen carbonate groups having the general formula resin-$[N(R_3)H^+][HCO_3^-]$. During the contacting step, the $HCO_3^-$ anion is exchanged with the anion of the salt of the strong acid thereby forming a salt of the cation of the salt of the strong acid and of the liberated $HCO_3^-$ anion, said salt of the cation of the salt of the strong acid and of the liberated $HCO_3^-$ anion reacting with the neutral weakly acidic free acid groups under the formation of carbonic acid ($H_2CO_3$), wherein the neutral weakly acidic free acid groups are converted in their salt form. As a consequence, during the whole desalination process the acidic groups and basic groups remain neutral (either in the free form or in the salt form).

U.S. Pat. No. 3,991,017 discloses hybrid copolymers (or IPN's) containing ion exchange functional groups (cationic and/or anionic), wherein the hybrid copolymers contain a crosslinked macroreticular host of a polyunsaturated monomer and a monethylenically unsaturated monomer, wherein said cross-linked macroreticular host is partially filled with a crosslinked gel copolymer phase of a polyunsaturated monomer and a monoethylenically unsaturated monomer. Hence, the hybrid copolymer consists of two cross-linked copolymer phases.

U.S. Pat. No. 3,645,922, incorporated by reference, discloses a composite adsorbent which is capable of being regenerated by elution with water or saline solutions at a temperature higher than the temperature at which adsorption occurs. The composite adsorbent is in the form of composite particles, wherein the composite particles comprise acidic and basic ion exchange resins which are dispersed in a homogeneous matrix of a water-insoluble polymeric material, the latter being a crosslinked polyelectrolyte or a crosslinked copolymer having neutral hydrophilic functional groups.

Mohan and Geckler, React. Funct. Polym. 67, 144-155, 2007, incorporated by reference, discloses polyampholyte hydrogels (interpenetrating networks) composed of positively and negatively charged units. The hydrogels are prepared from poly(N-isopropylacrylamide-co-sodium acrylate) and poly(ethyleneimine). The use of these polyampholyte hydrogels in ion separation processes is not explicitly disclosed.

Obviously, there is a need in the art for an ion exchange system that can be regenerated at moderate temperatures without the addition of chemicals.

SUMMARY OF THE INVENTION

The present invention relates to a process for separating a charged species from an aqueous system, wherein:
(a) a first aqueous system comprising the charged species is contacted at a first temperature with an ampholytic polymeric system comprising cationic and anionic domains, wherein the charged species is bonded to the ampholytic polymeric system; and
(b) the ampholytic polymeric system is contacted with a second aqueous system at a second temperature, wherein the charged species is released to the second aqueous system, wherein the second temperature is higher than the first temperature and wherein the second temperature is less than 60° C.

DETAILED DESCRIPTION OF THE INVENTION

Figure 1A:
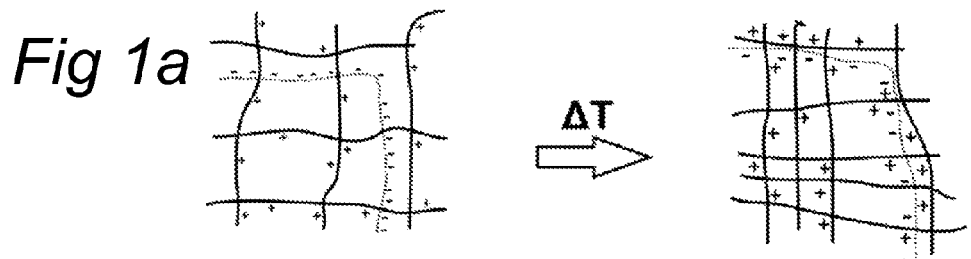
FIG. 1A shows a structure of a semi-IPN.
Figure 1B:
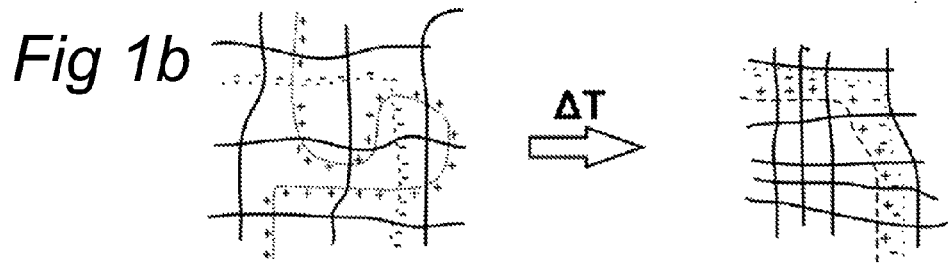
FIG. 1B shows another structure of a semi-IPN.
Figure 1C:
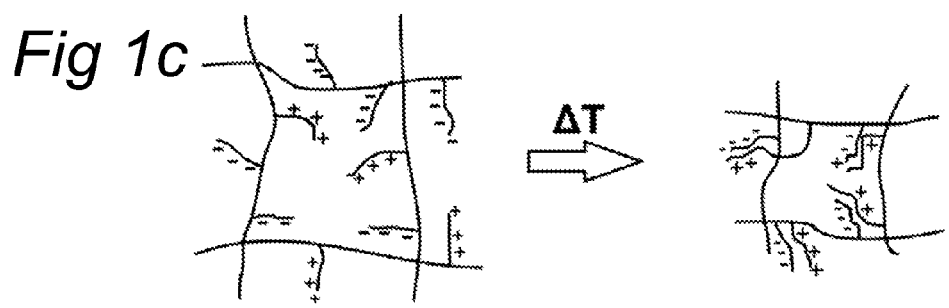
FIG. 1C shows a structure of a grafted polymer.
Figure 1D:
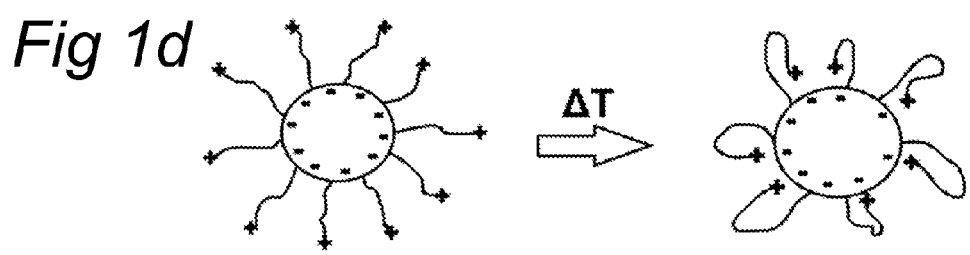
FIG. 1D shows a structure of a micellar system.
Figure 1E:
FIG. 1E shows a structure of a polymer brush.
Figure 1F:
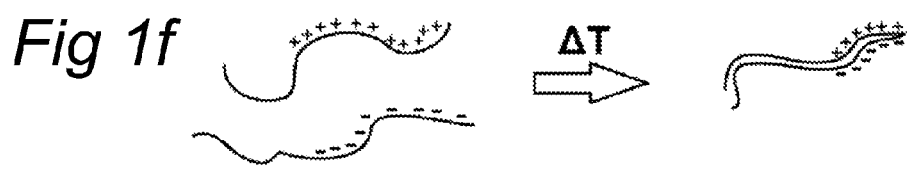
FIG. 1F shows a structure of a free polymeric system.

The verb "to comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the element are present, unless the context clearly requires that there is one and only one of the elements. The indefinite article "a" or "an" thus usually means "at least one".

According to the present invention, the first and second aqueous systems may originate from a single aqueous feed. In addition, the first and second aqueous system may be the same aqueous system. For example, within the scope of the present invention is a process wherein an aqueous feed is fed to a washing-machine equipped with a means for water softening, said means comprising the ampholytic polymeric system according to the invention, wherein in said means a quantity of water is first subjected to step (a), where after a major portion of the quantity of water is fed to the washing-machine and a minor portion is left into the means for water softening. After the washing process, which in Europe usually is performed at a temperature in the range of about 30° to about 95° C., is finished, the washing water is used to heat the minor portion of the quantity of water in the means for water softening, e.g. via a heat exchanger, so that step (b) of the process according to the present invention takes place.

In contrast to the working principle of the hybrid copolymers according to U.S. Pat. No. 4,152,496, WO 2005/103124 and US 2005/0234141, it is believed that the temperature increase induces shrinking of the polymer system, which induces the change in charge density of at least one of the cationic or anionic domains, making the charge neutralization effect much stronger and therefore the regeneration temperature, i.e. the temperature at which step (b) occurs, lower. Additionally, due to shrinking of the ampholytic polymeric system according to the present invention at elevated temperature, the charged species are believed to be "pushed out" of the ampholytic polymeric system.

According to the invention, it is preferred that upon raising the temperature from the first temperature to the second temperature, the charges of the cationic and/or anionic domains within the ampholytic polymer system are essentially neutralised. In addition, shrinkage of the ampholytic polymer system occurs thereby expelling the bonded charged species to the second aqueous system. Charge neutralisation "within" the ampholytic polymer system is to be understood as a charge neutralisation that is caused by "aggregation" of the charged domains of the polymeric system itself. Accordingly, in a preferred embodiment of the present invention, the ampholytic polymeric system shows temperature-induced charge neutralisation.

According to the present invention, it is therefore preferred that the temperature difference between the second temperature and the first temperature is less than 35° C., more preferably 30° C. or less and most preferably 25° C. or less.

In addition, it is also preferred that the regeneration temperature (second temperature) is less than 60° C., more preferably 55° C. or less, even more preferably 50° C. or less and most preferably 45° C. or less.

According to the present invention, the ampholytic polymeric system is more efficient than the ampholytic polymeric systems known from the prior art either because it can be regenerated at less than 60° C. or because the temperature difference between the second temperature and the first temperature is less than 35° C. Preferably, an ampholytic polymeric system is employed that fulfils both requirements, i.e. that it can be regenerated at a temperature of less than 60° C. and wherein the temperature difference between the second temperature and the first temperature is less than 35° C.

An important advantage of the ampholytic polymeric system according to the invention is that for extraction of the charged species from the ampholytic polymeric system to the second aqueous system it is unnecessary to employ a second aqueous system that has a high ionic strength. Accordingly, the second aqueous system can even be pure demineralised water and may also comprise one or more polar, optionally protic, organic solvents.

Since the ampholytic polymeric system will be extremely useful in demineralisation and softening processes of aqueous streams, it is preferred that the charged species are ionic species, more preferably cationic and/or anionic species, wherein the cationic species are preferably metal cations. As will be apparent to the person skilled in the art, a metal cation may be monovalent, divalent or multivalent and suitable examples of such a metal cation include $Na^+$, $Ba^{2+}$, $Mg^{2+}$, $Ca^{2+}$, $Al^{3+}$, $Ti^{4+}$, $V^{5+}$ and $Cr^{6+}$. The metal cation is most preferably $Ca^{2+}$. The anionic species are preferably inorganic anions, e.g. $Cl^-$, $CO_3^{2-}$, $SO_4^{2-}$, $PO_4^{3-}$ and the like, and organic anions derived from e.g. organic acids, for example carboxylates, sulphonates and phosphonates.

The ampholytic polymeric system will also be very suitable for the concentration of charged species, wherein the second aqueous system is recycled into the process.

According to the process according to the present invention, the difference between the second temperature and the first temperature is preferably between 1°-50° C., more preferably 2° C.-20° C., provided that the second temperature is less than 60° C. Alternatively, it is preferred that the first temperature is between 0° and 100° C., more preferably between 2° C. to 50° C., provided that the temperature difference between the second temperature and the first temperature is less than 35° C. or between 1°-less than 35° C., or between 1°-30° C., or between 1°-25° C. Most preferably, the ampholytic polymeric system according to the present invention fulfils both requirements, i.e. that the difference between the second temperature and the first temperature is preferably between 1°-50° C., more preferably 2° C. to 20° C., provided that the second temperature is less than 60° C. and that the first temperature is between 0° and 100° C., more preferably between 2° C. to 50° C., provided that the temperature difference between the second temperature and the first temperature is less than 35° C.

The process according to the present invention can preferably be performed in a reversible way. That is, that the process according to the present invention may comprise more than one sequence of steps (a) and (b), e.g. a sequence of three consecutive steps (a) and (b).

Without being bound by theory, it is believed that at the first temperature of the process for separating a charged species from an aqueous system, the cationic domains will essentially be neutralised by external anions and the anionic domains will essentially be neutralised by external cations. When the temperature is raised from the first temperature to the second temperature, the hydrophobic parts of the ampholytic polymer system, for example parts showing LCST behaviour, will collapse and "aggregate" thereby bringing anionic and cationic domains in their adjacency leading to charge neutralisation within the ampholytic polymeric system itself. The result is that the external cations and anions are expelled from the ampholytic polymer system.

The Ampholytic Polymeric System

The ampholytic polymeric system according to the present invention comprises cationic and anionic domains. Although not explicitly necessary, the ampholytic polymer system is preferably charge neutral.

An ampholytic polymeric system here is a system that comprises cationic and anionic domains. However, this does not mean that at any condition the system has anionic and cationic charges at the same time. It is conceivable that there are pH values where the system is complete cationic (low pH, about <4.5) and pH values where the system is complete anionic (high pH, about >9).

According to the invention, the ampholytic polymeric system is preferably selected from the group consisting of interpenetrating networks, semi-interpenetrating networks, random copolymerized networks, grafted polymeric systems, polymeric micelles, polymer brushes attached to a surface, polymer mixtures, or combinations thereof. Such polymeric systems are in principle known in the art.

An "interpenetrating polymer network" (IPN) is to be understood as a combination of two or more polymers in a network form, that are synthesised in juxtaposition or as a crosslinked polymer network held together by permanent entanglements (catenation), wherein the entanglements do usually constitute not covalent bonds but "topological bonds" (i.e. non-covalent bonds), e.g. H-bonds. A "semi-interpenetrating polymer network (semi-IPN)" means a polymer network of two or more polymers wherein one polymer is crosslinkable or cross-linked and the other is uncross-linked (cf. e.g. Encyclopedia of Polymer Science and Engineering Vol. 8; John Wiley & Sons, New York (1984) p. 279-332). So, in interpenetrating networks (IPN's) and in semi-interpenetrating networks (semi-IPN's), the polymer system basically consists of at least two interwoven polymer parts. In the case of an IPN, the individual parts are cross-linked whereas for a semi-IPN at least one of the polymer parts is not cross-linked. For IPN as well as for semi-IPN, it holds that both parts are not covalently bound to each other.

Accordingly, a (semi)-IPN preferably has one of the following structures:
- a crosslinked polymer matrix comprising a LCST-monomer, a cationic monomer and a crosslinker, interwoven by at least one homopolymer or copolymer comprising an anionic monomer (FIG. A);
- a crosslinked polymer matrix comprising a LCST-monomer, an anionic monomer and a crosslinker, interwoven by at least one homopolymer or copolymer comprising a cationic monomer;
- a crosslinked polymer matrix comprising a LCST-monomer and a crosslinker, interwoven by at least two separate homo- and/or copolymers, wherein one polymer comprises a cationic monomer and the other polymer comprises an anionic monomer (FIG. B); and (at least) two crosslinked polymer matrices interwoven by each other, wherein one matrix comprises a LCST-monomer, a cationic monomer and a crosslinker and wherein the second matrix comprises an anionic monomer and a crosslinker and optionally also a LCST-monomer.

A random copolymerized hydrogel has preferably the following structure:

a crosslinked polymer matrix comprising a LCST-monomer, a cationic monomer, an anionic monomer and a crosslinker.

A grafted polymer has preferably one of the following structures:

a branched crosslinked polymer matrix, wherein the backbone of the polymer comprises a LCST-monomer and a crosslinker, and the, optionally branched, side chains of the polymer matrix comprise a homopolymer or a copolymer comprising an anionic and a cationic monomer (i.e., that the branched polymer comprises anionic and cationic side chains; FIG. C); and a branched crosslinked polymer matrix, wherein the backbone consists of the polymer comprising a LCST-monomer, a crosslinker and an ionic monomer (cationic or anionic or a mixture thereof), and the optionally branched side chains comprise a homopolymer or a copolymer comprising an ionic monomer having an opposite charge to that of the ionic monomer comprised by the backbone.

A micellar system has preferably one of the following structures:

a polymeric system comprising at least two surfactants, wherein a first surfactant comprises a hydrophobic tail (e.g. polystyrene) and one or more anionic head groups and wherein a second surfactant comprises a hydrophobic tail connected to a block copolymer comprising a LCST monomer and one or more cationic head groups, wherein the two surfactants form a mixed micelle (FIG. D); and a polymeric system comprising at least two surfactants, wherein a first surfactant comprises a hydrophobic tail (e.g. polystyrene) and one or more cationic head groups and wherein a second surfactant comprises a hydrophobic tail, connected to a block copolymer of a LCST monomer and one or more anionic head groups, wherein the two surfactants form a mixed micelle.

A polymer brush has preferably one of the following structures:

a backbone polymer having side chains, where the side chains comprise a LCST monomer and an ionic monomer (cationic or anionic), wherein the backbone comprises an ionic monomer having an opposite charge to that of the ionic monomer comprised by the side chains (FIG. E);

a backbone having shorter and longer side chains, wherein the longer side chains comprise a LCST-monomer and an ionic monomer (cationic or anionic) and the shorter side chains comprise an ionic monomer having an opposite charge to that of the ionic monomer comprised by the longer side chains;

a polymer-brushed surface having side chains, wherein the side chains comprise a LCST monomer and an ionic monomer (cationic or anionic), wherein the surface comprises ionic charges having an opposite charge to that of the ionic monomer comprised by the side chains; and a polymer-brushed surface having short and long side chains, wherein the longer side chains comprise a LCST-monomer and an ionic monomer (cationic or anionic) and the shorter side chains comprise an ionic monomer having an opposite charge to that of the ionic monomer comprised by the longer side chains.

The ampholytic polymeric system according to the present invention may also comprise a free polymeric system comprising at least two polymers and/or copolymers interacting with each other. Preferred structures of this embodiment are a combination of a block copolymer comprising a LCST monomer and an anionic monomer and a block copolymer comprising a cationic monomer and optionally a LCST monomer (FIG. F).

Preferably, the ampholytic polymer system according to the present invention has a (pseudo)-phase transition in water between 0° C. and 100° C., which implies that the ampholytic polymeric system preferably has a LCST of 0° to 100° C. The ampholytic polymeric system preferably comprises a LCST-monomer, preferably in an amount of 0.1 mol % to 99.9 mol %, more preferably 40 mol % to 98 mol %, based on the total molar amount of monomers of the ampholytic polymer system.

According to a particularly preferred embodiment of the present invention, the ampholytic polymeric system comprises a semi-interpenetrating network (semi-IPN) comprising (i) 0.1 mol % to 99.9 mol %, preferably 40 mol % to 98 mol %, of a LCST-monomer, (ii) 0 mol % to 90 mol %, preferably 1 mol % to 40 mol % of a cationic monomer, (iii) 0 mol % to 90 mol %, preferably 1 mol % to 40 mol %, of an anionic monomer and (iv) 0.1 mol % to 10 mol %, preferably 0.1 mol % to 1 mol % of a crosslinker, based on the total molar amount of monomers of the ampholytic polymer system, provided that the sum of components (i) to (iv) is 100 mol %. In addition, it is furthermore preferred that the molar ratio of the cationic monomers to anionic monomers are in the range of 5:1 to 1:5, more preferably 2:1 to 1:2, even more preferably 1.5:1 to 1:1.5, yet even more preferably 1.3:1 to 1:1.3, yet even more preferably 1.2:1 to 1:1.2, and most preferably 1.1:1 to 1:1.1. Most preferably, the molar amount of cationic monomers is about equal to the molar amount of anionic monomers.

Preferably, the ampholytic polymer system has a total charge density of less than 42%, more preferably less than 40% and even more preferably less than 38%. The total charge is defined as 100%*(number of moles of charged monomers/total number of moles of monomers (charged and uncharged)).

According to the present invention, the (semi)-IPN is prepared in either a sequential manner or in a simultaneous manner. According to the sequential method, a preformed crosslinked polymer is swollen in a mixture comprising a second monomer or a prepolymer thereof and a second crosslinker, so that the second network is formed in situ. For example, a crosslinked polymer matrix comprising a LCST-monomer, a cationic monomer and a crosslinker is swollen in a mixture comprising an anionic monomer or a prepolymer thereof and a crosslinker. According to the simultaneous method, prepolymers or monomers of both networks are mixed with their respective crosslinkers so that both networks are formed simultaneously.

The present invention therefore also relates to a polymer system that is obtainable by copolymerising a monomer mixture comprising (i) 0.1 mol % to 99.9 mol %, preferably 40 mol % to 98 mol %, of a LCST monomer, (ii) 0 mol % to 90 mol %, preferably 1 mol % to 40 mol % of a cationic monomer, (iii) 0.1 mol % to 10 mol %, preferably 0.1 mol % to 1 mol % of a crosslinker, and (iv) in the presence of 0 mol % to 90 mol %, preferably 1 mol % to 40 mol %, of an anionic polymer, based on the total molar amount of monomers in the monomer mixture and monomers of the anionic polymer, provided that the sum of components (i) to (iv) is 100 mol %. In addition, it is furthermore preferred that the molar ratio of the cationic monomers to anionic monomers are in the range of 5:1 to 1:5, more preferably 2:1 to 1:2, even more preferably 1.5:1 to 1:1.5, yet even more preferably 1.3:1 to 1:1.3, yet even more preferably 1.2:1 to 1:1.2, and most preferably 1.1:1 to 1:1.1. Most preferably, the molar amount of cationic monomers is equal to the molar amount of anionic units of the anionic polymer.

An LCST-monomer is herein defined as a monomer that upon incorporation into a homopolymer or copolymer provides a LCST (LCST means "lower critical solution temperature") to said homopolymer or copolymer. The LCST monomers are preferably vinyl and isopropenyl monomers comprising functional groups. Such functional groups include, but are not limited to, formamide, alkylamide, ether, alcohol, ester, amine, lactam, carboxylic acid, monoalkyl or aryl ester of sulphuric acid, alkyl or aryl sulfonic acid, alkyl or aryl ester of phosphoric acid, P-aryl or alkyl phosphonic acid, dialkyl or aryl phosphinic acid. More preferably the LCST monomer is $N-(C_1-C_{12})$alkyl acrylamide, wherein the alkyl groups may independently be linear, branched or cyclic. Most preferably, the alkyl group is branched. Most preferably, the LCST monomer is N-isopropylacrylamide (NIPAAm).

The cationic monomers are preferably vinyl and isopropenyl monomers containing a cationic form of primary, secondary or tertiary alkyl or aryl amine or of nitrogen-containing heterocyclic aromatic compounds. The cationic form of primary, secondary or tertiary alkyl or aryl amines have preferably the formula $CH_2=C(R)-R'-NR^1R^2.R^*X$, where $R=H, CH_3$, $R'$=absent, am optionally functionalised spacer, $R^1$ and $R^2$ are independently selected from H, $C_{1-12}$ linear or branched alkyl, or $C_{6-12}$ aryl, X=halogen or ½ $SO_4$, $R^*$ is H, $C_{1-12}$ linear or branched alkyl, or $C_{6-12}$ aryl, more preferably allylamine hydrochloride, $CH_2=CHCH_2NH_2.HCl$, or vinylpyridine hydrochloride, $CH_2=CHC_5H_5N.HCl$, or a polymer or copolymer thereof or salts of N-(aminoalkyl) acrylamides or methacrylamides having the formula $CH_2=CRC(O)NH-R^3-NR^1R^2.R^*X$, $R^1$, $R^2$ and $R^*$ are as mentioned above and $R^3=C_{1-12}$ linear or branched alkylene, X=halogen or ½ SO4, most preferably the cationic monomer is 2-(dimethylamino)ethylacrylamide-hydrochloride ($DMEA^3m.HCl$), or a polymer or copolymer thereof.

The anionic monomers are preferably vinyl and isopropenyl monomers containing an anionic group of e.g. an acid such as carboxylate, sulfonate, phosphate, phosphonate, phosphinate. The anionic group is preferably a carboxylate. According to a particular preferred embodiment of the invention, the anionic monomer is (meth)acrylic acid in the anionic form. According to an other preferred embodiment the anionic monomer is N-(1-oxo-2-propenyl)-β-alanine in the anionic form, $CH_2=CHC(O)NHCH_2CH_2CO_2^-$.

According to a preferred embodiment of the present invention, the ampholytic polymeric system comprises an anionic polymeric moiety, preferably an anionic polyacrylate, preferably having a $M_w$ in the range of 500 to 3000000, most preferably 5000 to 1250000, wherein the polyacrylate has one or more alkali (earth) metal cations as counter ion. Most preferably, the anionic polymer is sodium polyacrylate (PANa). According to another preferred embodiment the anionic polymer is a polymer or copolymer of the sodium salt of N-(1-oxo-2-propenyl)-β-alanine.

The crosslinker is most preferably N,N'-methylenebisacrylamide (MBAAm).

EXAMPLES

Example 1

Synthesis of a Semi-IPN

The gels were prepared by free radical copolymerization using ammonium persulfate/N,N,N',N'-tetramethylethylenediamine (APS/TMEDA) as redox initiator. The chemicals (with the exception of APS) were covered with water under argon atmosphere and the reaction mixture was stirred on a magnetic stirrer until all solids were dissolved. When necessary NaCl was added to prevent precipitation. APS was then added to initiate the polymerisation, and after 1 minute, the magnetic stirring bar was removed from the homogenous mixture, which was left for at least 12 hours to slowly react into a hydrogel. The hydrogel was removed from the flask and put into deionised water during at least one day, period during which the water was renewed several times. Finally the hydrogel was dried in a drying oven for 24 hours at 80° C.

In Table 1 the composition of five hydrogels are given, with PAlA.HCl as polyallylamine hydrochloride, NPAM as N-Piperidylacrylamide and $DMBzEA^3mCl$ as acryloyloxyethyl-(benzyl)dimethylammonium chloride.

TABLE 1

Composition of hydrogels (the mole equivalents are based on the amount of NIPAAm).

|  |  | RX6 | RX5 | RX110 | RX102 | RX86 |
|---|---|---|---|---|---|---|
| NIPAAm | [g] | 2.5 | 2.5 | 2.5 | 2.5 | 2.5 |
| PANa | [mol. eq] | 0.05* | 0.05# | 0.185* | 0.15* | 0.15* |
| $DMEA^3m$•HCl | [mol. eq] | 0.05 | — | 0.18 | — | 0.15 |
| PAlA•HCl | [mol. eq] | — | 0.05* | — | — | — |
| $DMBzEA^3mCl$ | [mol. eq] | — | — | — | 0.15 | — |
| NPAM | [mol. eq] | — | — | 0.33 | 0.33 | 0.33 |
| MBAAm | [mol. eq] | 0.005 | 0.005 | 0.2 | 0.006 | 0.006 |
| APS | [mol. eq] | 0.003 | 0.003 | 0.003 | 0.003 | 0.003 |
| TMEDA | [mol. eq] | 0.003 | 0.003 | 0.003 | 0.003 | 0.003 |
| degassed water | [mL] | 44 | 44 | 44 | 44 | 44 |

*calculation amount based on monomers.
monomers used instead of polymer.

Example 2

Calcium Binding Experiment

In order to determine the calcium binding capacity of the hydrogel according to Example 1, about 250 mg of dry hydrogel were put into 100 mL of $5*10^{-4}$ mol/L $CaCl_2$ solution and $8.5*10^3$ mol/L NaCl, for a ratio of anionic groups in the gel/total mole of $Ca^{2+}$ of about 2. The solution was kept at 20° C. for three days to equilibrate, followed by three days equilibration at 50° C. Samples of 10 mL were taken at both temperatures and calcium analysed by colorimetric titration with EDTA. Additionally, the swelling of the gels was measured at both temperatures by weighing the gels on a balance.

To quantify the efficacy and the efficiency of the calcium binding properties two quantities were defined and calculated using the experimental data:

$$Ca^{2+}_{red} = 100\% * \frac{[Ca^{2+}]_0 - [Ca^{2+}]_m}{[Ca^{2+}]_0} \quad [1]$$

with $Ca^{2+}_{red}$ as the percentage the calcium concentration which has been reduced compared to total concentration, $[Ca^{2+}]_0$ as the total concentration calcium and $[Ca^{2+}]_m$ as the measured concentration calcium. $Ca^{2+}_{red}$ is a measure of the efficacy for calcium binding of the gel.

$$\theta = 100\% * \frac{2([Ca^{2+}]_0 V_0 - [Ca^{2+}]_m V_m)}{n_{An}} \quad [2]$$

with θ as the gel occupancy or the fractional binding, $V_0$ as the total liquid volume, $V_g$ as the gel volume, $V_m$ as the liquid volume outside the gel and $n_{An}$ as the number of moles of anionic groups inside the gel. $\theta_r$ is a measure of the efficiency for calcium binding of the gel.

$$EF = \frac{Ca^{2+}_{red,20C} - Ca^{2+}_{red,50C}}{\varphi_{gel,20C}} \quad [3]$$

With EF as the effectivity factor of a single binding/regeneration process and $\phi_{gel, 20\,C}$ as the percentage of the total volume occupied by the swollen gel at 20° C. This factor accounts for the volume increase of the gel during binding.

In Table 2 the results are depicted for five semi-IPN gels, called RX5, RX6, RX110, RX102 and RX86. RX6 was synthesized according to the composition given in Table 1. RX5 was obtained similarly by using the monomer sodium acrylate instead of PANa and the cation used was polyallylamine hydrochloride (PAlA.HCl) instead of DMEA³m.HCl. In the experiment with RX86, about 1 g of dry gel was used instead of 250 mg of gel.

TABLE 2

(Calcium binding results for four semi-IPN gels)

| Gel: | 20° C. | | 50° C. | | EF |
|---|---|---|---|---|---|
| | $Ca^{2+}_{red}$ | $\theta_r$ | $Ca^{2+}_{red}$ | $\theta_r$ | |
| RX5 | 18.6 | 18.5 | 5.4 | 4.9 | 3.0 |
| RX6 | 22.1 | 23.1 | 0.1 | 1.0 | 3.3 |
| RX102 | 36.2 | 17.3 | 15.9 | 7.1 | 9.5 |
| RX110 | 25.6 | 11.5 | 8.5 | 3.5 | 15.4 |
| RX86 | 81.6 | 9.0 | 24.8 | 2.7 | 3.9 |

From Table 2 it can be seen that all gels have an affinity for calcium cations at 20° C., while this affinity is reduced significantly at a temperature of 50° C. At 50° C., the gel has a much smaller volume as compared to the volume at 20° C. because of the shrinking Normally this would imply a higher charge density at 50° C. and consequently a higher calcium binding affinity at this temperature. The results from Table 2 are showing the opposite effect and prove that charge neutralization between the polyelectrolytes is taking place inside the gel.

Structures of the Gels

Hydrogels RX6, RX102, RX110 and RX86 are examples of a semi-IPN wherein a crosslinked polymer matrix comprising a LCST-monomer, a cationic monomer and a crosslinker, is interwoven by a homopolymer of an anionic monomer (FIG. A). Only RX6 uses no hydrophobic comonomer in the network.

Hydrogel RX5 is an example of a semi-IPN wherein a crosslinked polymer matrix comprising a LCST-monomer, an anionic monomer and a crosslinker, is interwoven by a homopolymer of a cationic monomer.

Example 3

Randomly Copolymerized Ampholytic Hydrogel

Gel B13 is a random copolymerized gel in which the cationic as well as the anionic charges are copolymerized in the main NIPAAm network. In table 3 the composition of gel B13 is given. A similar calcium binding experiment was performed with gel B13 as described in Example 2, with the difference that the calcium chloride concentration was $1.0*10^{-3}$ mol/L and the sodium chloride concentration was $2.0*10^{-4}$ mol/L. The results are presented in Table 4.

TABLE 3

Composition of hydrogel B13 (the mole equivalents are based on the amount of NIPAAm).

| | B13 |
|---|---|
| NIPAAm [g] | 2.5 |
| Sodium acrylate [mol. eq] | 0.05 |
| DMEA³m•HCl [mol. eq] | 0.05 |
| MBAAm [mol. eq] | 0.005 |
| APS [mol. eq] | 0.003 |
| TMEDA [mol. eq] | 0.003 |
| degassed water [mL] | 44 |

TABLE 4

(Calcium binding results for hydrogel B13)

| Gel: | 20° C. | | 50° C. | | EF |
|---|---|---|---|---|---|
| | $Ca^{2+}_{red}$ | $\theta_r$ | $Ca^{2+}_{red}$ | $\theta_r$ | |
| B13 | 17.4 | 35.75 | 4.73 | 8.84 | 1.39 |

Comparative Example 1

Hydrogel PEI 3 according to Table 1 of Mohan and Geckler, React. Funct. Polym. 67, 144-155, 2007 was prepared and was subjected to the calcium binding test disclosed in Example 2. At 20° C., $Ca^{2+}_{red}$ was 9% and at 50° C., $Ca^{2+}_{red}$ was 9.7%. So at 50° C., no regeneration of the hydrogel PEI 3 occurred.

Comparative Example 2

A hydrogel similar to Hydrogel PEI 2 according to Table 1 of Mohan and Geckler, React. Funct. Polym. 67, 144-155, 2007 was prepared and was subjected to the calcium binding test disclosed in Example 2. This hydrogel could not be regenerated.

The invention claimed is:

1. A process for separating a charged species from an aqueous system, wherein the process comprises the following steps:
   (a) contacting a first aqueous system comprising the charged species at a first temperature with an ampholytic polymeric system comprising cationic and anionic groups, wherein the charged species is bonded to the ampholytic polymeric system; and
   (b) contacting the ampholytic polymeric system with a second aqueous system at a second temperature less than 60° C., wherein the charged species is released to the second aqueous system, and wherein the second temperature is higher than the first temperature; and
   wherein the ampholytic polymeric system is an interpenetrating network or a semi-interpenetrating network; the interpenetrating network or the semi-interpenetrating network comprising a cationic monomer and an anionic monomer, wherein the molar ratio of cationic monomers to anionic monomers is in the range of 5:1 to 1:5, wherein the cationic monomer has the formula:

$CH_2=C(R)-R'-NR^1R^2.R^*X$ wherein:
   R is selected from the group consisting of H and $CH_3$; R' is absent, or an optionally functionalised spacer; $R^1$ and $R^2$ are independently selected from the group consisting of H, $CH_2$ linear or branched alkyl and $C_{6-12}$ aryl; X is halogen or ½ $SO_4$; and R* is H, $CH_{1-2}$ linear or branched alkyl, or $C_{6-12}$ aryl, or a polymer or copolymer thereof; or
   wherein the cationic monomer has the formula:

$CH_2=CRC(O)NH-R^3-NR^1R^2.R^*X$ wherein R is selected from the group consisting of H and $CH_3$, $R^1$ and $R^2$ are independently selected from the group consisting of H, $CH^2$ linear or branched alkyl and $C_{6-12}$ aryl, R* is H, $C_{1-12}$ linear or branched alkyl, or $C_{6-12}$ aryl, $R^3$ is $C_{1-12}$ linear or branched alkyl, and X is halogen or ½ $SO_4$, and wherein the interpenetrating network or the semi-interpenetrating network comprises a lower critical solution temperature (LCST) monomer.

2. The process according to claim 1, wherein the charged species is an ionic species.

3. The process according to claim 2, wherein the ionic species is in the form of salt.

4. The process according to claim 1, wherein the anionic monomers are selected from the group consisting of vinyl and isopropenyl monomers containing a carboxylate, a sulfonate, a phosphate, a phosphonate, and a phosphinate group.

5. The process according to claim 1, wherein the interpenetrating polymer network comprises at least two interwoven polymer parts, wherein the polymer parts are crosslinked.

6. The process according to claim 1, wherein the semi-interpenetrating network comprises at least two interwoven polymer parts, wherein at least one polymer part is not crosslinked.

7. The process according to claim 1, wherein the second temperature is 55° C. or less.

8. The process according to claim 7, wherein the difference between the second temperature and the first temperature is between 1°-less than 35° C.

9. The process according to claim 7, wherein the difference between the second temperature and the first temperature is between 2°-20° C.

10. The process according to claim 1, wherein the second temperature is 50° C. or less.

11. The process according to claim 10, wherein the difference between the second temperature and the first temperature is between 1°-less than 35° C.

12. The process according to claim 10, wherein the difference between the second temperature and the first temperature is between 2°-20° C.

13. The process according to claim 1, wherein the second temperature is 45° C. or less.

14. The process according to claim 13, wherein the difference between the second temperature and the first temperature is between 1°-less than 35° C.

15. The process according to claim 13, wherein the difference between the second temperature and the first temperature is between 2°-20° C.

16. The process according to claim 1, wherein the difference between the second temperature and the first temperature is between 1°-50° C.

17. The process according to claim 7, wherein the difference between the second temperature and the first temperature is between 1°-50° C.

18. The process according to claim 10, wherein the difference between the second temperature and the first temperature is between 1°-50° C.

19. The process according to claim 13, wherein the difference between the second temperature and the first temperature is between 1°-50° C.

20. The process according to claim 1, wherein the difference between the second temperature and the first temperature is between 1°-less than 35° C.

21. The process according to claim 1, wherein the difference between the second temperature and the first temperature is between 2°-20° C.

22. The process according to claim 1, wherein the first temperature is between 0° and 100° C., provided that the difference between the second temperature and the first temperature is between 1°-less than 35° C.

23. The process according to claim 22, wherein the difference between the second temperature and the first temperature is between 1°-30° C.

24. The process according to claim 23, wherein the difference between the second temperature and the first temperature is between 1°-25° C.

* * * * *